3,790,477
LATICES FOR SEWAGE COAGULATION
Ralph R. Nielsen, Chicago, and William R. Busler, Park Forest, Ill., assignors to Nalco Chemical Company, Chicago, Ill.
No Drawing. Continuation-in-part of abandoned application Ser. No. 201,398, Nov. 23, 1971. This application Feb. 2, 1972, Ser. No. 222,998
Int. Cl. B01d 21/02; C02b 1/20
US. Cl. 210—47          8 Claims

ABSTRACT OF THE DISCLOSURE

Thickening or dewatering solids from sewage comprising the addition of an aqueous solution of a water-soluble vinyl addition polymer made by the invention of a polymeric latex.

---

This is a continuation-in-part of co-pending application Ser. No. 201,398, filed Nov. 23, 1971, now abandoned.

INTRODUCTION

This invention relates to an improved method of thickening or dewatering solids from sewage. More particularly, the process comprises the addition of an aqueous solution of a water-soluble vinyl addition polymer made by the inversion of a polymeric latex to a waste suspension under floc forming conditions and thereafter allowing the solids to settle from the suspension to provide a clear aqueous supernatant.

Sewage contains suspended solids which must be removed before these liquids are suitable for dumping in the lakes and oceans or alternatively for industrial and potable applications. The types of sewage and nature and concentration of the suspended solids vary greatly. A common method for removal of suspended solids from various types of sewage is by the well-known chemical process of coagulation. In the main, a method of coagulation usually comprises addition to the aqueous solution to be treated of certain chemicals known as coagulants, mixing of chemical additive and aqueous liquid whereby floc formation occurs, and subsequent removal of this floc by a variety of methods. The latter step may be affected by mechanical separation means or by merely allowing forces of gravity to work upon the agglomerated solids whereby a removable sludge layer is created.

Sewage ordinarily is a dilute aqueous mixture of the waste from household and industry that is convenient and economical to carry away by water. As used in this specification and the appended claims, the term "sewage" refers to many of the ordinary types of aqueous liquors containing significant amounts of waste, such as, domestic waste, industrial waste, and such like, and is not to be construed to be limited to meaning only aqueous liquors which in lay terms are ordinarily called sewage, nor should it be construed as being limited to mean aqueous liquors which have actually been carried through pipes, conduit, or sewers.

Chemical treatment of sewage is will known to those versed in the prior art. In the past, the inorganic materials, such as alum, lime, ferrous or ferric salts, etc., have been added to speed up settling and to aid in filtration. Recent changes in the composition of sewage suspension have resulted from the use of synthetic detergents instead of soaps for washing and general cleaning. Both industrial and household waste at present may contain considerable quantities of synthetic detergents which keep solid material suspended. It, thus, appears that the purpose of the synthetic detergents as used by the housewife is to suspend and keep suspended the very particles which is sewage treatment are to be settled out.

Considerable effort has been spent by industry to develop an economical and efficient process for thickening and dewatering sewage. Prior art attempts to optimize this process have led to the use of various anionic and cationic polymers.

Water-soluble cationic polyelectrolytes have been used in the prior art for thickening and dewatering sewage waste suspensions. These polymers are well known to the art and have been described in numerous publications and patents. Polymers most commonly used in many sewage applications are water-soluble homo- and copolymeric derivatives of acrylamide. Also useful are homopolymers and copolymers of other vinyl monomers such as maleic anhydride, acrylic acid, dimethyl sulfate quat of dimethylaminoethyl methacrylate, dimethylaminoethyl methacryalte, acrylonitrile, styrene and the like. Other water-soluble vinyl polymers are described in detail in the following U.S. Pats.: 3,418,237; 3,259,570; and 3,171,805.

Up until the present time most of the polymers described above were in the form of solid dry powders which were dissolved in water before use in specific applications. It has been discovered that the use of an aqueous solution of a water-soluble addition polymer made by the inversion of a polymeric latex exhibits exceptionally improved results in treatment of sewage over the results obtained from treatment with an aqueous solution of the solid dry powder polymer.

OBJECTS

It is, therefore, an object of this invention to provide an improved method for thickening and dewatering sewage.

A further object of this invention is to provide a method of optimizing the efficiency of coagulation of sewage.

A more specific object is to provide a method of thickening or dewatering solids from sewage comprising the addition of an aqueous solution of a water-soluble vinyl addition polymer made by the inversion of a polymeric latex to a waste suspension under floc forming conditions and thereafter allowing the solids to settle from the suspension to provide a clear aqueous supernate.

Other objects will appear hereinafter.

THE INVENTION

In accordance with the invention, an improved method of thickening or dewatering solids from sewage has been discovered comprising the addition of an aqueous solution of a water-soluble vinyl addition polymer formed by the inversion of a polymeric latex added to the sewage under floc forming conditions and thereafter allowing the solids to settle from or dewatered by vacuum filtration the sewage to provide a clear aqueous supernate. The polymeric latex is produced by the steps of:

(A) Forming a water-in-oil emulsion from:

(1) water which contains dissolved therein a water-soluble ethylenic unsaturated monomer, thereby producing a monomer phase which has a concentration of from 30–70% by weight of said emulsion;
(2) an inert hydrophobic liquid;
(3) a water-in-oil emulsifying agent in a concentration of from 0.1–10% by weight;
(4) a free radical initiator;

(B) Heating said emulsion under free radical forming conditions to polymerize the water-soluble ethylenic unsaturated monomer forming a polymer which is contained in the emulsion; and (C) Polymerizing said monomer in the water-in-oil emulsion to produce a polymeric latex.

As indicated, this process produces a polymeric latex which comprises a water-in-oil emulsion which contains dispersed therein a finely-divided water-soluble vinyl addition polymer.

This process involves the formation of an emulsion by the addition of a monomer phase to an oil phase containing an emulsifying agent. The monomer phase is comprised of water-soluble ethylenic unsaturated monomer in an aqueous solution. The monomer phase concentration may range from 30–70% by weight of the emulsion. The oil phase is any inert hydrophobic liquid such as hydrocarbons and substituted hydrocarbons. The inert hydrophillic liquid concentration ranges from 5–40% by weight of the emulsion. Any emulsifying agent which is oil soluble is acceptable.

All known polymerizable water-soluble ethylenic unsaturated monomers, the polymers of which are insoluble in the continuous oil phase, can be polymerized by a water-in-oil emulsion polymerization process to give a polymeric latex. Such monomers have a water solubility of at least 5 weight percent and include acrylamide, methacrylamide, acrylic acid, methacrylic acid, vinyl benzyl dimethyl ammonium chloride, alkali metal and ammonium salts of a 2-sulfoethylacrylate, sodium styrene sulfonate, 2-aminoethylmethacrylate hydrochloride, alkali metal and ammonium salts of vinyl benzyl sulfonates and the like. Preferred copolymers of this invention are the copolymers of acrylamide with either sodium acrylate or dimethylaminoethyl methacrylate. The most preferred copolymer of acrylamide is that with the dimethyl sulfate quat of dimethylaminoethyl methacrylate. Extremely excellent results have been obtained using this particular copolymer. The preferred ratio of acrylamide to sodium acrylate is 70:30 while the preferred ratio of acrylamide to the dimethyl quat of dimethylaminoethyl methacrylate is 95:5. The ratio of acrylamide to the dimethyl quat of dimethylaminoethyl methacrylate may range from 95:5 to 60:40. When aqueous solutions of the monomers are used, they can vary widely in monomer content. Proportions between 70 and 30% by weight monomer correspondingly to 30 to 70% water are used, depending upon the monomer and the temperature of polymerization. The ratio of monomer phase to oil phase is also widely variable, advantageously between 30 and 70 parts of the former to between 70 and 30 parts of the latter by weight. A monomer phase to oil phase ratio of about 70 to 30 is preferred.

In order to emulsify the monomer phase into the oil phase to give a water-in-oil emulsion, an emulsifying agent of the water-in-oil type is used in amount ranging between 0.1 and 10% by weight of the oil phase. Any conventional water-in-oil emulsifying agent can be used, such as hexadecyl sodium phthalate, sorbitan monooleate, sorbitan monostearate, cetyl or stearyl sodium phthalate, metal soaps, and the like.

The oil phase can be any inert hydrophobic liquid which can readily be separated from the disperse phase polymeric product.

A preferred group of organic liquids are the hydrocarbon liquids which include both aromatic and aliphatic compounds. Thus, such organic hydrocarbon liquids as benzene, xylene, toluene, mineral oils, kerosenes, naphthas and, in certain instances, petrolatums may be used. A particularly useful oil from the standpoint of its physical and chemical properties is the branch-chain isoparaffinic solvent sold by Humble Oil and Refining Company under the tradename "ISOPAR M." Typical specifications of this narrow-cut isoparaffinic solvent are set forth below in Table I:

TABLE I

| Specification properties | Minimum | Maximum | Test method |
| --- | --- | --- | --- |
| Gravity, API at 60/60° F | 48.0 | 51.0 | ASTM D 287. |
| Color, Saybolt | 30 | | ASTM D 156. |
| Aniline point, ° F | 185 | | ASTM D 611. |
| Sulfur, p.p.m | | 10 | ASTM D 1266 (nephelometric mod.). |
| Distillation, ° F.: | | | |
| IBP | 400 | 410 | ASTM D 86. |
| Dry point | | 495 | |
| Flash point, ° F. (Pensky-Martens closed cup) | 160 | | ASTM D 93. |

Free radical yielding initiators useful in polymerizing ethylenic unsaturated monomers, such as benzoyl peroxide, lauroyl peroxide, 2,2′-azobis(isobutyronitrile), potassium persulfate and the like are used in the polymerization, advantageously in amounts ranging between 0.02 and 1.0% by weight of the oil or monomer phase, depending upon the solubility of the initiator. Polymerization can also be carried out using high energy irradiation, or high energy electrons from a Van de Graaff accelerator, etc., or ultraviolet irradiation.

Elevated reaction temperatures, advantageously between 40° and 70° C., are used with free radical yielding initiators. Within such a temperature range, conversion is substantially complete in from one-half hour to several days, depending upon monomer and reaction variables. High energy or ultraviolet irradiation polymerization is carried out at room temperature or above or below room temperature, as desired.

The polymeric latex which is made by this procedure is inverted in the presence of water. The polymer-containing emulsion releases the polymer in water in a very short period of time.

The polymer-containing emulsions may be inverted by any number of means. The most convenient means resides in the use of a surfactant added to either the polymer-containing emulsion or to the water into which it is to be dissolved. The placement of a surfactant into the water causes the emulsion to rapidly invert and release the polymer in the form of an aqueous solution. When this technique is used to invert the polymer-containing emulsion the amount of surfactant present in the water may vary over a range of 0.01 to 50% based on polymer. Good inversion often occurs within the range of 1.0–10% based on polymer.

The surfactants

The preferred surfactants are hydrophylic and are further characterized as being water-soluble. Any hydrophilic-type surfactant such as ethoxylated nonyl phenols, ethoxylated nonyl phenol formaldehyde resin, dioctyl esters of sodium sulfosuccinate, and octyl phenol polyethoxy ethanol can be used.

Other surfactants that may be employed include the soaps such as sodium and potassium myristate, laurate, palmitate, oleate, stearate, resinate, and hydroabietate, the alkali metal alkyl or alkylene sulfates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof; and salts of higher means like lauryl amine hydrochloride, and stearyl amine hydrobromide.

Any anionic, cationic, or nonionic compound can be used as a surfactant.

Following is a list of suitable surfactants that could be used in the practice of this invention. Any water-soluble surfactant could be used, but naturally some are more efficient than others. Useful surfactants include, but are not limited to: polyoxyethylene alkyl phenol, polyoxyethylene (10 mole) cetyl ether, polyoxyethylene alkyl-aryl ether, polyoxyethylene monolaurate, polyoxyethylene vegetable oil, polyoxyethylene sorbitan monolaurate, polyoxyethylene esters or mixed fatty and resin acids, polyoxyethylene sorbitol lanolin derivative, polyoxyethylene (12 mole) tridecyl ether, polyoxyethylene sorbitan esters of mixed fatty and resin acids, polyoxyethylene sorbitan monostearate, polyoxyethylene sorbitan monooleate, polyoxyethylene monostearate, polyoxyethylene (20 mole) stearyl ether, polyoxyethylene (20 mole) oleyl ether, polyoxyethylene (15 mole) tridecyl ether, polyoxyethylene fatty alcohol, polyoxyethylene alkyl amine, polyoxyethylene glycol monopalmitate, polyoxyethylene sorbitan monopalmitate, polyoxyethylene (20 mole) cetyl ether, polyoxyethylene oxypropylene stearate, polyoxyethylene lauryl ether, polyoxyethylene lanolin derivative, sodium oleate, quaternary ammonium derivative, potassium oleate, N-cetyl N-ethyl morpholinium ethosulfate, and pure sodium lauryl sulfate.

In addition to using the water-soluble surfactants described above, other surfactants may be used such as silicones, clays and the like which are included as surfactants since, in certain instances, they tend to invert the emulsion even though they are not water-soluble.

In other specific cases the surfactant may be directly added to the polymer-containing emulsion; thereby rendering it self-inverting upon contact with water. These products, while capable of being used in certain systems, must be carefully formulated since the surfactants may tend to interact with the emulsifier or the emulsion and destroy it prior to its being used.

Other techniques for inverting the emulsions include the use of agitation, high voltage electrical fields, heat and pH shift, as well as the placement into the water, into which the polymer-containing emulsion is to be dissolved, certain electrolytes. For any particular polymer-containing emulsion a suitable method for its inversion may be readily determined by routine experimentation.

The inverted polymeric latex is added to the sewage in the manner as generally known to the art. It should, of course, be kept in mind, as will be obvious to those skilled in the art, that the optimum dosage of chemical coagulants for any particular sewage to be treated is distinctly an individual problem and can be best determined only by actual tests. However, it has been generally found that the optimum dosage ranges from 0.2 to 20 lb./ton of active polymeric latex based on sewage solids.

Examples

As illustrative of the marked improvement of this invention, the thickening and dewatering ability of the inverted polymer latex was measured and compared to that of dry solid polymers dissolved in water. The filter test experiments were performed on sewage samples obtained from a municipal sewage treatment plant from a midwestern state. The sewage treatment filter leaf test procedure is described in Nalco Chemical Company technical literature called Technifax TF 52. In general, this procedure involves treatment of an 800 ml. sample of sewage suspension, having approximately 6% solids. The appropriate chemical dosage is added to the sewage sludge sample and mixed for 30 seconds at 100 r.p.m. A circular leaf filter having an area of 0.1 square feet is then placed in the sewage sample and a vacuum of 15 inches is applied to the filter. The filter is immersed for 60 seconds at which time it is removed from the sewage sludge sample. The vacuum is continued for an additional 120 seconds to allow for additional drying. The wet cake is then recovered and the filtrate is recovered. The appropriate weights are recorded.

The particular sewage suspensions used for testing had from 4 to 8% by weight suspended solids and the results are shown in the following tables.

TABLE II

4% sewage waste suspension

| Polymer | Type | Dosage, lb./ton | Cake wt., grams | Filtrate, ml. | Lb./ft.$^2$/ hr. | Yield improvement, percent |
|---|---|---|---|---|---|---|
| Acrylamide-DMAEM | Dry | 0.4 | 30 | 150 | 2.48 | |
| Do | Dry | 0.8 | 40 | 172 | 3.31 | |
| Do | Inverted latex | 0.4 | 59 | 180 | 4.88 | 96 |
| Do | do | 0.8 | 83 | 242 | 6.87 | 100 |

TABLE III

6% sewage waste suspension

| Polymer | Type | Dosage, lb./ton | Cake wt., grams | Filtrate, ml. | Lb./ft.$^2$/ hr. | Yield improvement, percent |
|---|---|---|---|---|---|---|
| Acrylamide-DMAEM | Dry | 0.4 | 34.6 | 120 | 2.86 | |
| Do | Dry | 0.6 | 43.0 | 128 | 3.56 | |
| Do | Inverted latex | 0.4 | 53.6 | 170 | 4.43 | 54 |
| Do | do | 0.6 | 73.7 | 208 | 6.10 | 71 |

TABLE IV

8% sewage waste suspension

| Polymer | Type | Dosage, lb./ton | Cake wt., grams | Filtrate, ml. | Lb./ft.$^2$/ hr. | Yield improvement, percent |
|---|---|---|---|---|---|---|
| Acrylamide-DMAEM | Dry | 0.2 | 32.0 | 120 | 2.65 | |
| Do | Dry | 0.4 | 35.0 | 124 | 2.90 | |
| Do | Dry | 0.6 | 44.4 | 135 | 3.67 | |
| Do | Dry | 0.8 | 39.6 | 162 | 3.28 | |
| Do | Inverted latex | 0.2 | 53 | 153 | 4.38 | 65 |
| Do | do | 0.4 | 68.3 | 161 | 5.65 | 95 |
| Do | do | 0.6 | 78.0 | 179 | 6.45 | 78 |
| Do | do | 0.8 | 90.0 | 193 | 7.45 | 130 |

TABLE V

8% sewage waste suspension

| Polymer | Type | Dosage, lb./ton | Cake wt., grams | Filtrate, ml. | Lb./ft.$^2$/ hr. | Yield improvement, percent |
|---|---|---|---|---|---|---|
| Acrylamide-DMAEM | Dry | 2.0 | 19.4 | 142 | 1.3 | |
| Do | Dry | 2.5 | 22.1 | 180 | 1.5 | |
| Do | Dry | 3.0 | 24.1 | 204 | 1.6 | |
| Do | Inverted latex | 2.0 | 36.1 | 230 | 1.8 | 40 |
| Do | do | 2.5 | 35.7 | 283 | 2.4 | 60 |
| Do | do | 3.0 | 37.5 | 265 | 2.6 | 62 |

TABLE VI

10% sewage waste suspension

| Two-polymer treatment | Type | Dosage, lb./ton | Cake wt., grams | Filtrate, ml. | Lb./ft.²/ hr. | Yield improvement, percent |
|---|---|---|---|---|---|---|
| Acrylamide-acrylic/polyamine [1] | Dry/liquid | 0.3/10 | 41.3 | 170 | 2.9 | |
| Do | Inverted latex/liquid | 0.24/10 | 96.2 | 260 | 6.7 | 130 |

[1] Acrylamide-acrylic ratios are 70:30.

TABLE VII

8% sewage waste suspension

| Polymer | Type | Dosage, lb./ton | Cake wt., grams | Filtrate, ml. | Lb./ft.²/ hr. | Yield improvement, percent |
|---|---|---|---|---|---|---|
| Acrylamide-DMAEM quaternized with dimethyl sulfate | Dry | 0.4 | 38.0 | 143 | 2.9 | |
| Do | Dry | 0.8 | 41.6 | 155 | 3.62 | |
| Do | Inverted latex | 0.4 | 79.8 | 183 | 6.52 | 124 |
| Do | do | 0.8 | 103.2 | 225 | 8.32 | 130 |

The data tabulated in Tables II through VI shows the improvement of the inverted polymeric latex over the standard dry polymer. The improvement of the polymeric latices over the dry solid polymer is in most cases more than 70%. The most marked increase is noted in Table VII using the copolymer of acrylamide and the dimethyl sulfate quat of dimethylaminoethyl methacrylate (95:5) where the yields were increased up to 130%.

It should be noted that all dosages were on an active polymer basis. Thus, for example, with a treatment level of 0.4 lb./ton, for both the solid polymer solution and the inverted latex samples, each had 0.4 pounds of polymer per ton of sewage. With this in mind and in view of the fact that the yields were improved from approximately 40 to 70%, these unexpected results lead to the conclusion that the aqueous solution made by the inversion of the polymeric latex results in improved thickening and dewatering of sewage.

We claim:

1. In a process for thickening or dewatering solids from sewage of the type wherein the following steps are performed:

(A) forming an aqueous solution of a water-soluble polymer or copolymer of acrylamide in water;

(B) adding said aqueous solution of polymer or copolymer of acrylamide in water formed in Step A to sewage under floc forming conditions;

(C) allowing said solids to settle from said sewage to provide a clear aqueous supernatant;

the improvement which comprises using an aqueous solution of polymer or copolymer of acrylamide in water which is prepared by the inversion of a polymeric latex in water, wherein said polymeric latex is produced by the steps of:

(a) forming a water-in-oil emulsion from:
(1) water which contains dissolved therein acrylamide or acrylamide with at least one other water-soluble ethylenic unsaturated monomer, thereby producing a monomer phase which has a concentration of from 30–70% by weight of said emulsion;
(2) a liquid hydrocarbon;
(3) a water-in-oil emulsifying agent in a concentration of from 0.1–10% by weight;
(4) a free radical initiator;

(b) heating said emulsion under free radical forming conditions to polymerize the acrylamide or acrylamide and at least one other water-soluble ethylenic unsaturated monomer which is contained in the emulsion; and (c) polymerizing said acrylamide or acrylamide and at least one other water-soluble ethylenic unsaturated monomer in the water-in-oil emulsion to produce said polymeric latex.

2. The method of claim 1 wherein the polymer is an acrylamide-sodium acrylate copolymer.

3. The method of claim 2 wherein the weight ratio of acrylamide to sodium acrylate is 70:30.

4. The method of claim 1 wherein the polymer is a copolymer of acrylamide-dimethylaminoethyl methacrylate quaternized with dimethyl sulfate.

5. The method of claim 4 wherein the ratio of acrylamide to the dimethyl sulfate quat of dimethylaminoethyl methacrylate is 95:5.

6. The method of claim 1 which comprises the addition to said sewage from about 5 to 60 p.p.m. of active polymeric latex based on solids.

7. The method of claim 1 wherein the liquid hydrocarbon is an aliphatic liquid hydrocarbon.

8. The method of claim 4 wherein the liquid hydrocarbon is an aliphatic liquid hydrocarbon.

References Cited

UNITED STATES PATENTS

| | | | |
|---|---|---|---|
| 3,493,501 | 2/1970 | Eck | 210—54 |
| 3,479,283 | 11/1969 | Harrison et al. | 210—54 |
| 3,472,767 | 10/1969 | Lees | 210—10 X |
| 3,493,500 | 2/1970 | Volk et al. | 210—54 |
| 3,658,772 | 4/1972 | Volk et al. | 210—54 X |
| 3,023,162 | 2/1962 | Fordyce et al. | 210—54 |

SAMIH N. ZAHARNA, Primary Examiner

T. G. WYSE, Assistant Examiner

U.S. Cl. X.R.

210—54

UNITED STATES PATENT OFFICE
CERTIFICATE OF CORRECTION

Patent No. 3,790,477       Dated February 5, 1975

Inventor(s) RALPH R. NIELSEN et al

It is certified that error appears in the above-identified patent and that said Letters Patent are hereby corrected as shown below:

Column 1, line 16 for "invention" read --inversion--.

Signed and sealed this 11th day of March 1975.

(SEAL)
Attest:

RUTH C. MASON
Attesting Officer

C. MARSHALL DANN
Commissioner of Patents
and Trademarks